July 5, 1960    C W. MUSSER    2,943,508
STRAIN WAVE GEARING-LINEAR MOTION
Filed Jan. 9, 1957    12 Sheets-Sheet 1
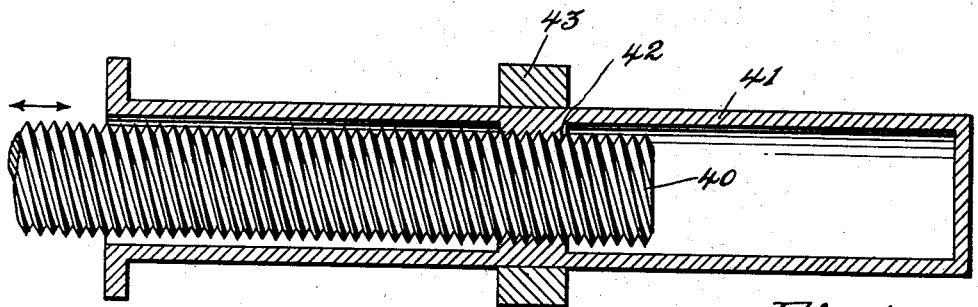
Fig. 1.
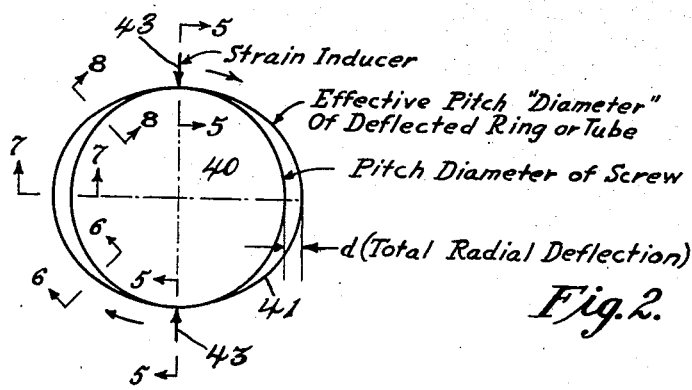
Fig. 2.
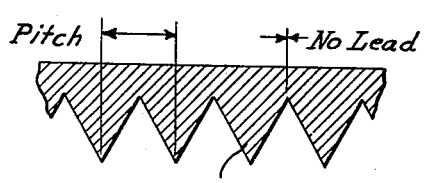
Fig. 3.
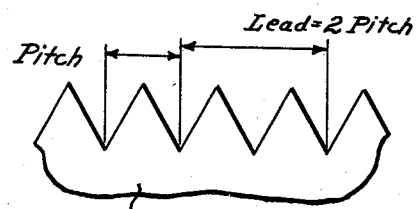
Fig. 4.
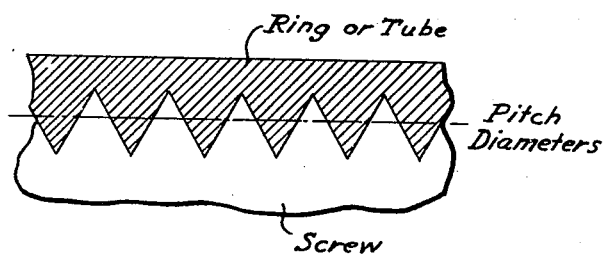
Fig. 5.
INVENTOR
C. WALTON MUSSER
BY
ATTORNEYS July 5, 1960  C W. MUSSER  2,943,508
STRAIN WAVE GEARING-LINEAR MOTION
Filed Jan. 9, 1957  12 Sheets-Sheet 2

INVENTOR
C WALTON MUSSER
BY
ATTORNEYS

INVENTOR
C WALTON MUSSER
BY
ATTORNEYS

INVENTOR
C WALTON MUSSER
BY
ATTORNEYS

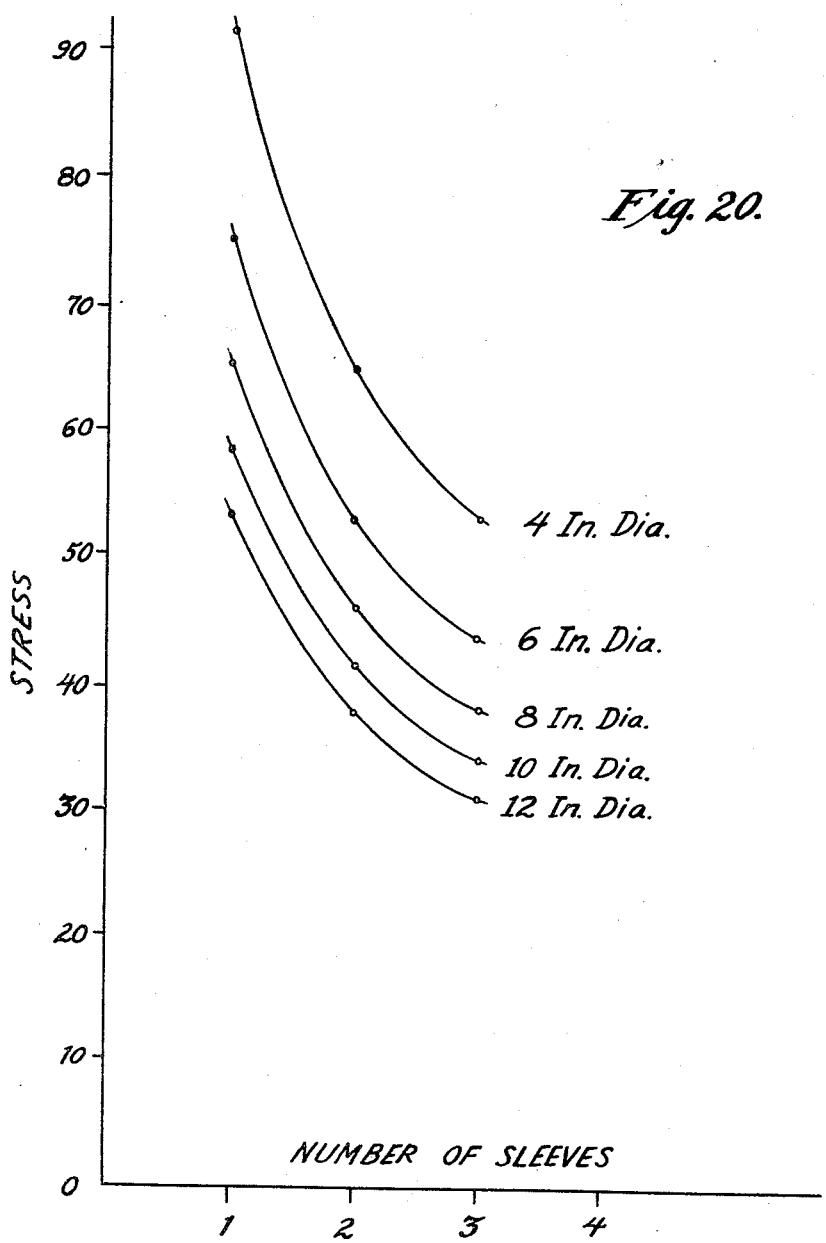

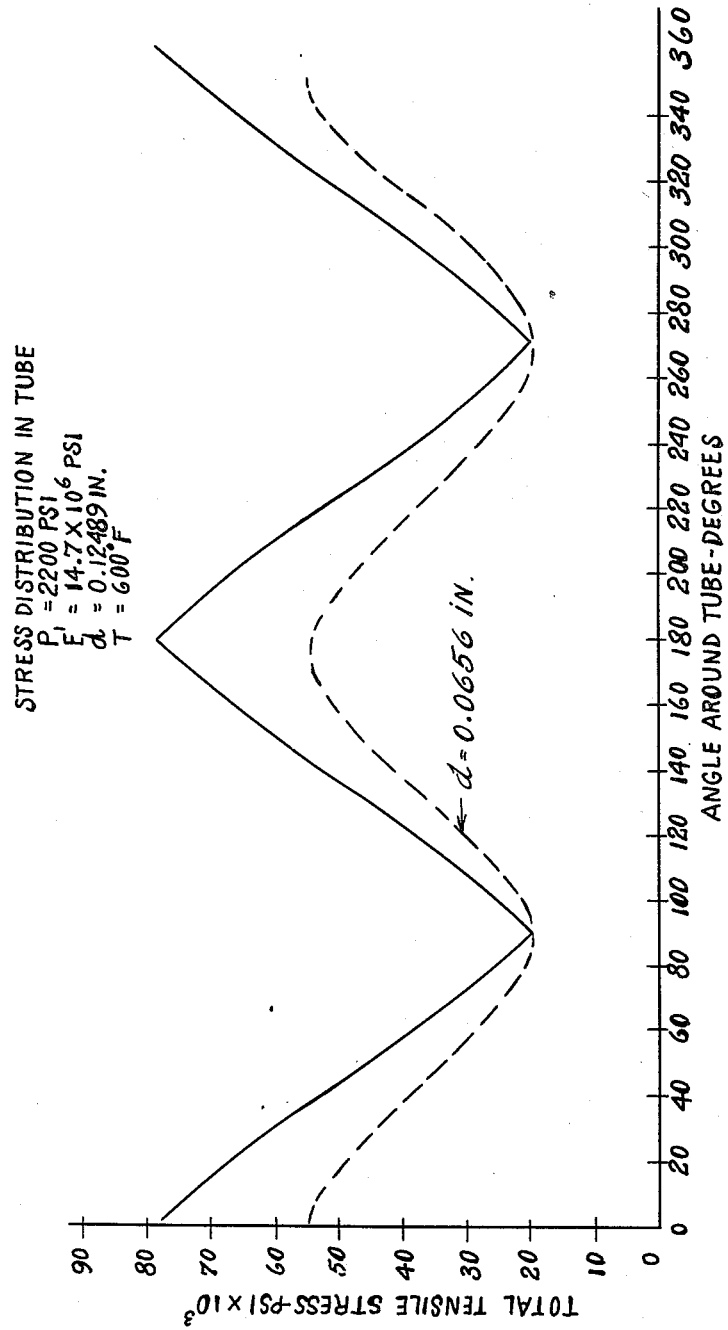

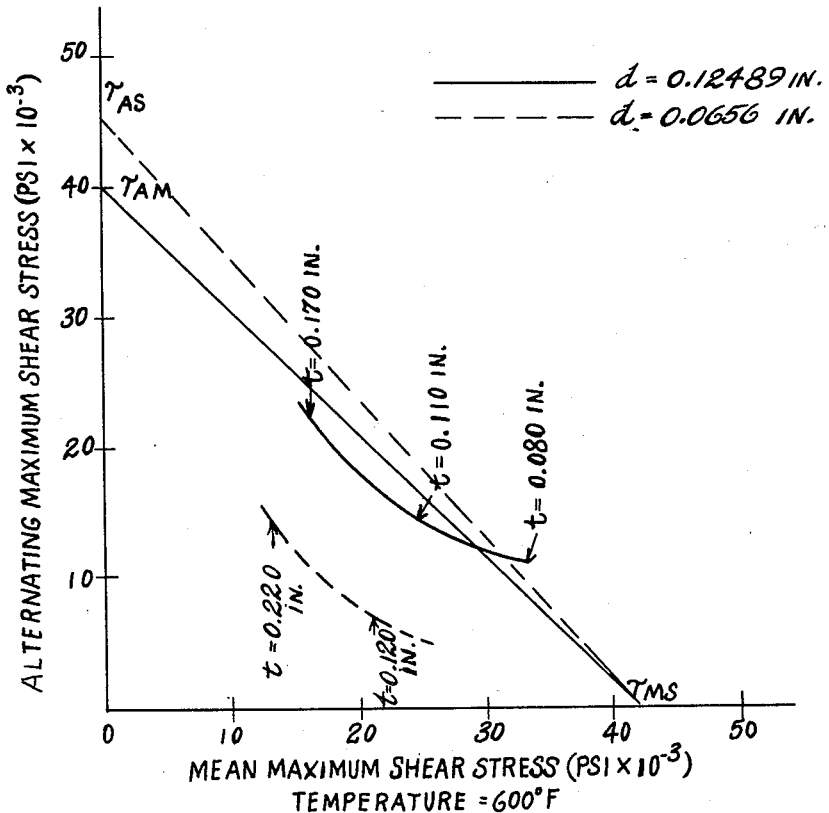
SODERBERG DIAGRAM
TEMPERATURE = 600°F
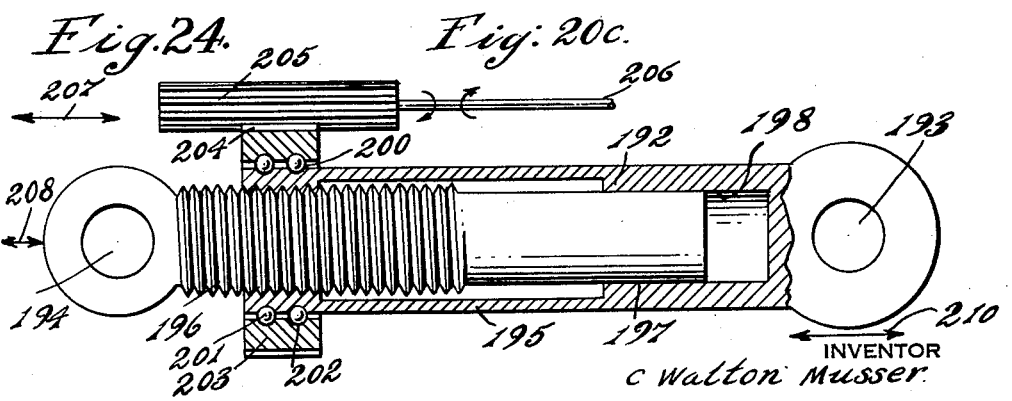

July 5, 1960 C W. MUSSER 2,943,508
STRAIN WAVE GEARING-LINEAR MOTION
Filed Jan. 9, 1957 12 Sheets-Sheet 12

INVENTOR
C Walton Musser
BY
ATTORNEYS

United States Patent Office 2,943,508
Patented July 5, 1960

2,943,508
STRAIN WAVE GEARING-LINEAR MOTION

C Walton Musser, Beverly, Mass., assignor to United Shoe Machinery Corporation, Boston, Mass., a corporation of New Jersey Filed Jan. 9, 1957, Ser. No. 633,254

32 Claims. (Cl. 74—424.8)

The present invention relates to mechanism for converting rotational motion into linear motion, preferably on the opposite side of a separating wall or tube.

The present invention is a further development of the subject matter of my application Serial No. 495,479, filed March 21, 1955, for Strain Wave Gearing, now U.S. Patent 2,906,143 granted September 29, 1959.

A purpose of the invention is to intermesh a strain tube having circumferential grooves or thread-like surfaces on one side with a second circumferentially grooved member or screw having the same pitch of circumferential grooves or thread-like surfaces, the leads of the circumferential grooves or thread-like surfaces on the tube and the second circumferentially grooved member or screw being different, and to deform the tube by engagement with a strain inducer acting on the surface of the tube remote from the second circumferentially grooved member or screw, the input being applied as desired either through the strain inducer, through the second circumferentially grooved member or screw or through the tube, and the output being obtained through one or two of the other members.

A further purpose is to propagate a strain wave which advances circumferentially of the strain tube and produces engagement between the circumferential grooves or thread-like surfaces at a plurality of areas of contact around the circumference.

A further purpose is to secure freedom from backlash in a linear actuator, thus securing very precise transmission of motion.

A further purpose is to secure effective contact between a strain tube having circumferential grooves or thread-like surfaces and a second circumferentially grooved member or screw having a different lead with a minimum of relative rotation, the effective inducing motion between the circumferential grooves or thread-like surfaces being generally radial and the output being axial.

A further purpose is to operate a circumferentially grooved member or screw in relation to a similar circumferentially grooved or thread-like surface with very small circumferential motion.

A further purpose is to operate a circumferentially grooved member or screw mechanism with low groove or thread sliding velocity.

A further purpose is to balance the forces in circumferentially grooved or screw engagement and therefore reduce or eliminate lateral components on the circumferential grooves or threads.

A further purpose is to provide a circumferentially grooved member or screw acting in cooperation with a circumferentially grooved or threaded member whereby sliding friction of the circumferential grooves or screw threads is minimized.

A further purpose is to have the motion between the circumferentially grooved member or screw and its mating grooves or threads in rolling contact instead of sliding contact.

A further purpose is to operate a circumferentially grooved or screw device with sinusoidal groove or thread motion.

A further purpose is to permit operation of a circumferentially grooved member or screw selectively having either left or right hand circumferential grooves or threads in cooperation with a strain tube having circumferential grooves or thread-like surfaces which are without lead or which have a different lead.

A further purpose is to secure relatively low circumferential groove or thread contact pressure by having the resilient tube deflect so as to distribute or apply load equally over all the contacting circumferential grooves or threads.

A further purpose is to secure a high efficiency at a low helix angle.

A further purpose is to obtain ease of lubrication in a circumferential groove or screw mechanism.

A further purpose is to distribute the input stresses at a different location from the output stresses in a circumferential groove or screw mechanism.

A further purpose is to propagate a strain wave around a circumferential groove or screw system mechanically, electrically or by other suitable means.

A further purpose is to obtain reliable, accurate, and trouble-free operation of mechanism on the opposite side of a separating wall or inside a hermetically sealed container, by means of an actuator.

A further purpose is to permit control of the strain wave by superimposing one ellipsoid on another ellipsoid in the strain inducer.

A further purpose is to positively convert rotary motion into linear motion by the rotation of a strain wave around the periphery of a strain tube or ring, thereby causing progessively advancing inter-engagement of circumferential groove or thread-like surfaces between axially fixed and axially movable members.

A further purpose is to optionally engage and disengage the circumferential grooves or threads on the strain tube and the circumferentially grooved member or screw.

A further purpose is to make the circumferential grooved member or screw and the strain tube completely "scrammable" or completely capable of clearing from one another for the purpose of relative movement axially, by releasing the strain inducer pressure when desired, and providing clearance between the external and internal circumferential grooves or threads in the undeflected condition of the strain tube.

Further purposes appear in the specification and in the claims.

In the drawings, I have chosen to illustrate a few only of the numerous embodiments in which my invention may appear, selecting the forms shown from the standpoints of convenience in illustration, satisfactory operation and clear demonstration of the principles involved.

Figure 1 is a diagrammatic axial section of a device in accordance with the invention.

Figure 2 is a diagram useful in explaining the invention, and illustrating the radial relationship between the circumferential grooves or threads on the strain tube and on the circumferentially grooved member or screw.

Figure 3 is an enlarged axial section of one example of the circumferential grooves or threads on the ring or tube, in the case in which they have no lead.

Figure 4 is a view similar to Figure 3 showing the circumferential grooves or threads on the circumferential grooved member or screw in the case where the leads are equal to twice the pitch.

Figures 5, 6, 7 and 8 are sections taken respectively on the lines 5—5, 6—6, 7—7 and 8—8, showing the relative positions of the circumferential grooves or threads on the strain tube or ring and the circumferential grooves or threads on the circumferentially grooved member or screw at the same moment in respect to the positioning of the strain wave, the sections being taken on Figure 2.

Figure 9:
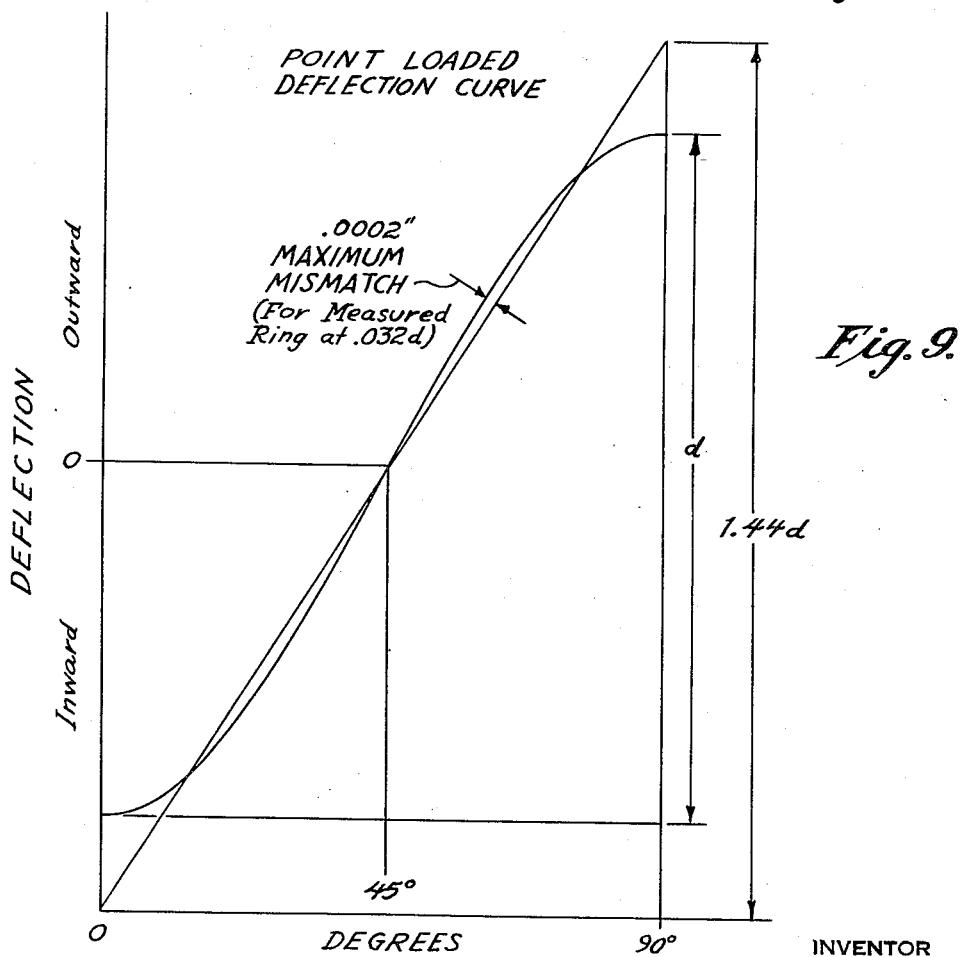

Figure 9 is a diagram plotting deflection against degrees of arc, showing radial tooth motion for a point loaded wave.

Figure 10:
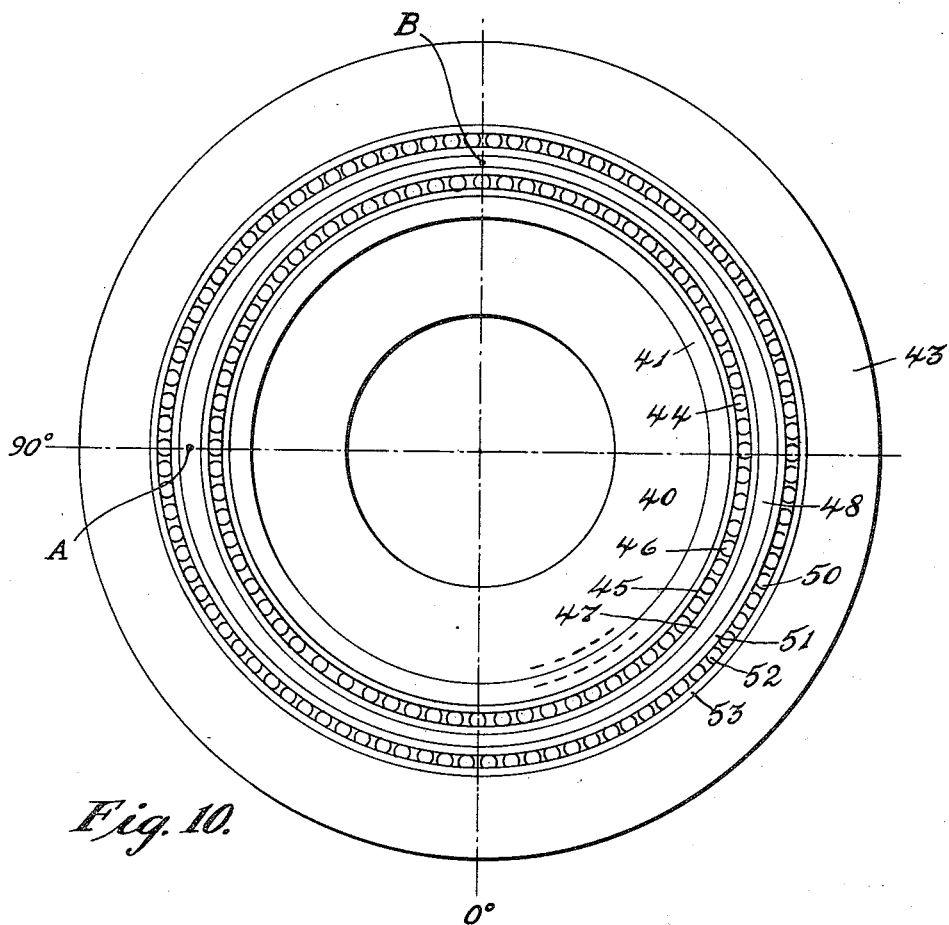

Figure 10 is a diagrammatic end elevation, showing a double bearing strain inducer useful in the application.

Figure 11:
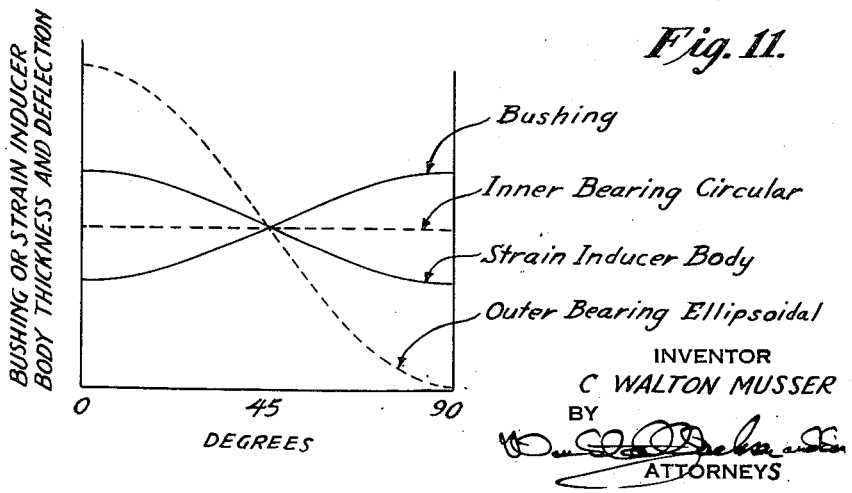

Figure 11 is a diagram plotting bushing or strain inducer body thickness and deflection against degrees of arc.

Figures 12, 13:
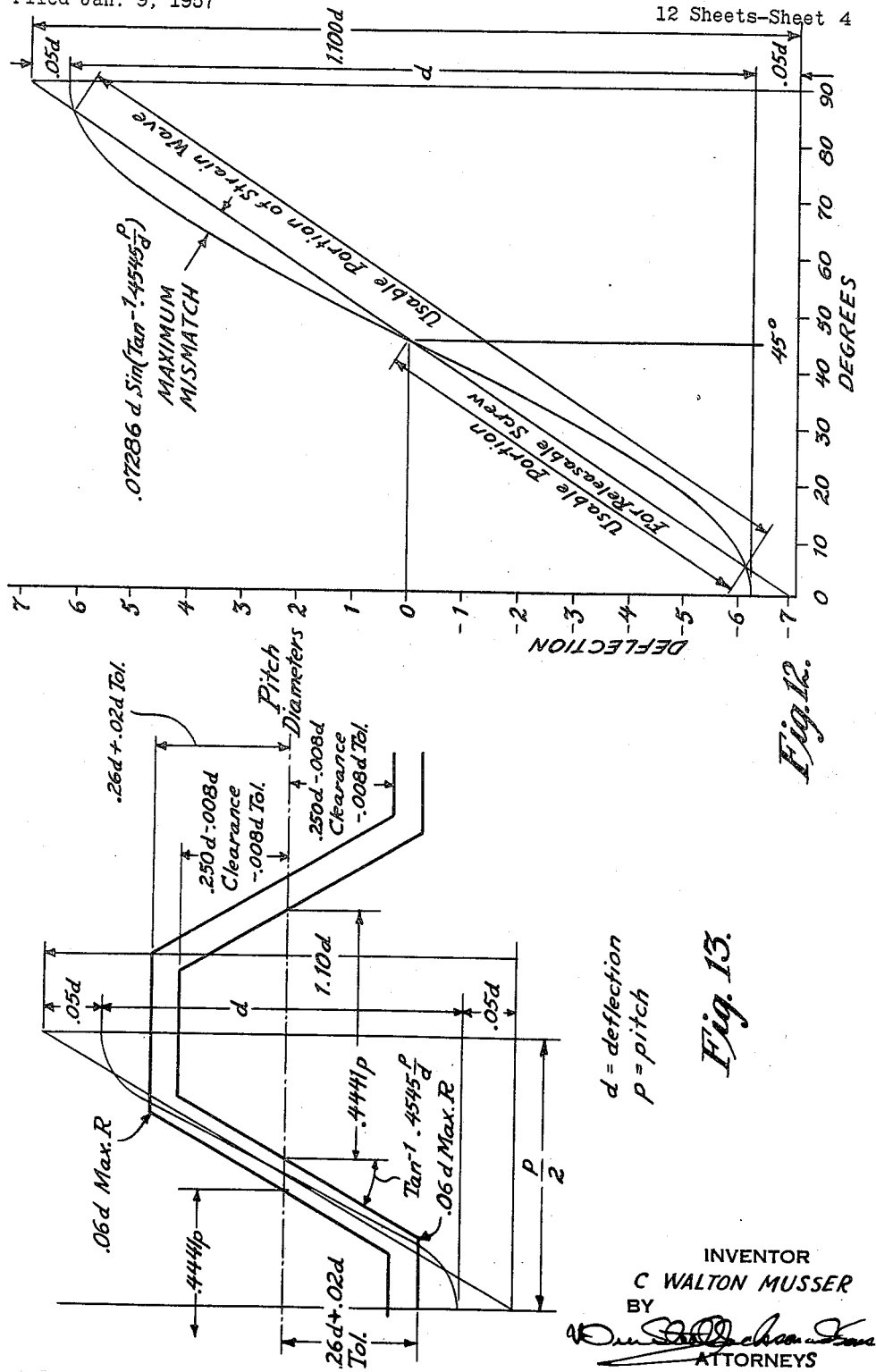

Figure 12 is a diagram plotting radial tooth motion against degrees of arc, Figure 12 being plotted for a resultant wave.

Figure 13 is a diagram showing tooth form as derived from the parameters of Figure 12.

Figures 14a to 14ee are diagrams showing the relative motion of a strain tube tooth with respect to a circumferentially grooved member or screw tooth for each three degrees of arc for 90° of arcuate motion.

Figure 15:
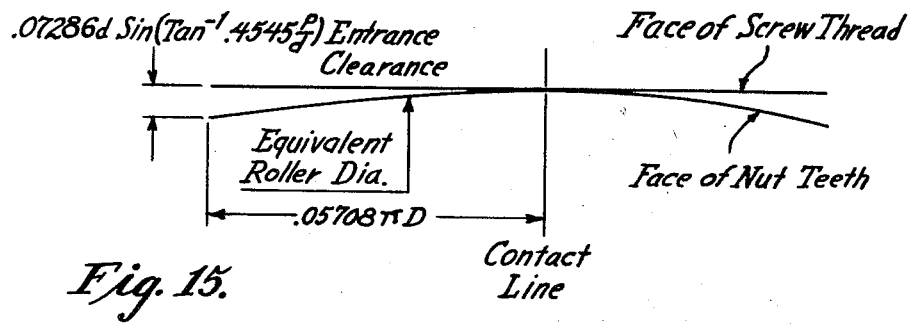

Figure 15 is a diagram showing the surface relationship of the teeth on each side of the contact surface.

Figure 16:
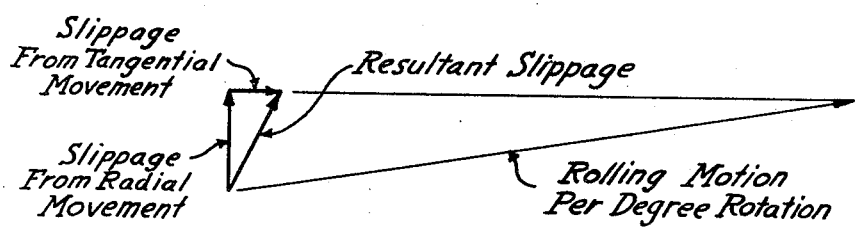

Figure 16 is a vector diagram showing slippage versus rolling motion.

Figure 17:
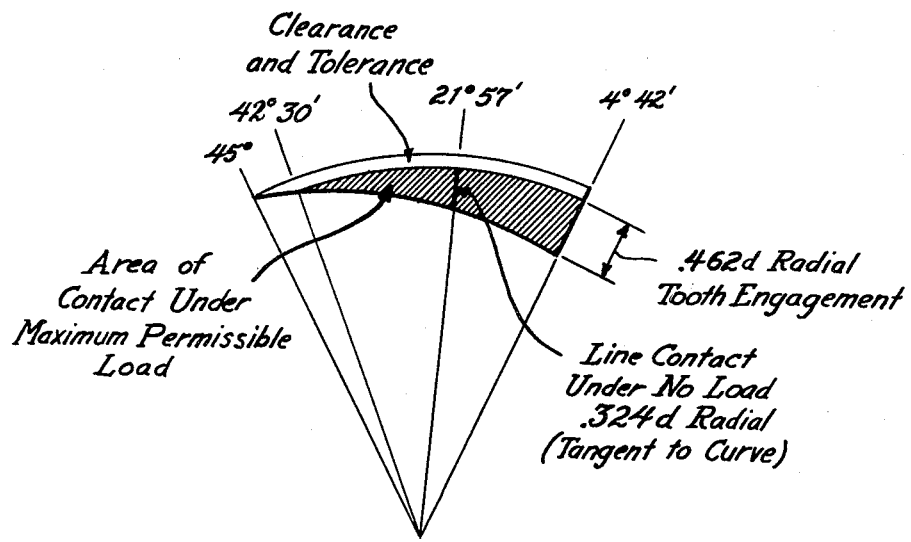

Figure 17 is a diagram which illustrates tooth interengagement.

Figure 18:
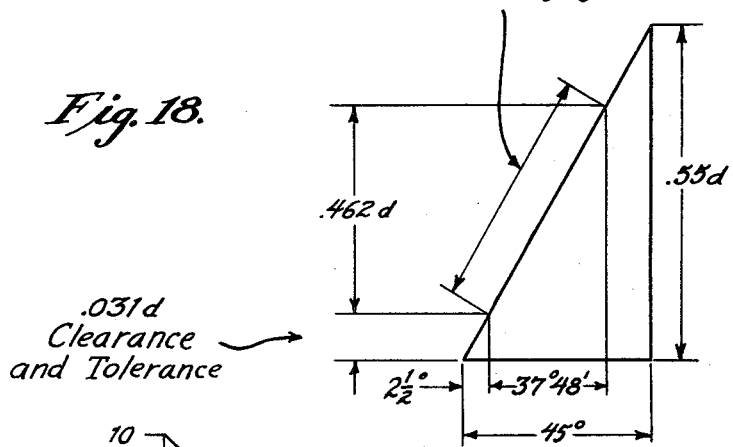

Figure 18 is a diagram illustrating geometric proportions of tooth contact interrelationships.

Figure 19:
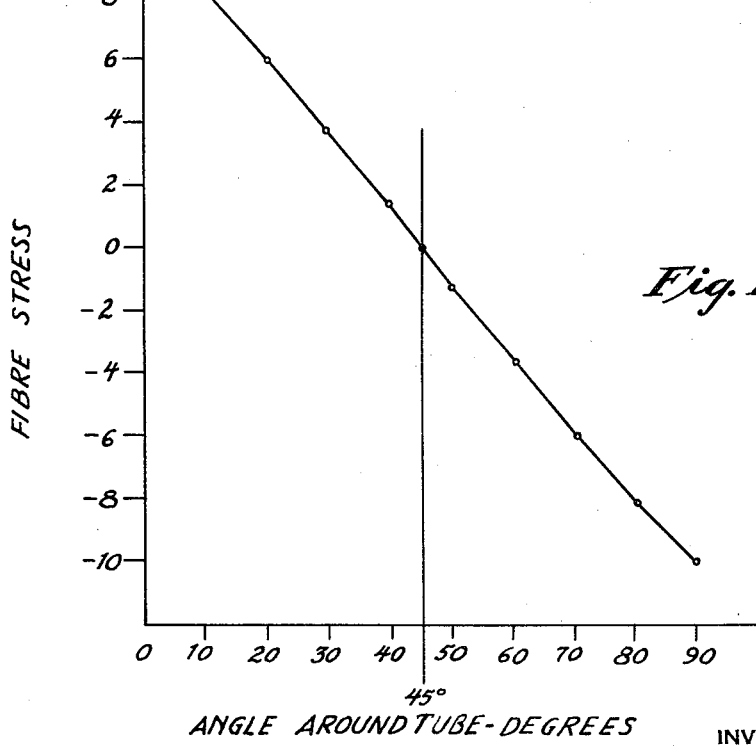

Figure 19 is a diagram plotting fiber stress against the angle around the strain tube in degrees.

Figure 20 is a diagram plotting stress against the number of sleeves for various diameters of the tube.

Figure 20A:
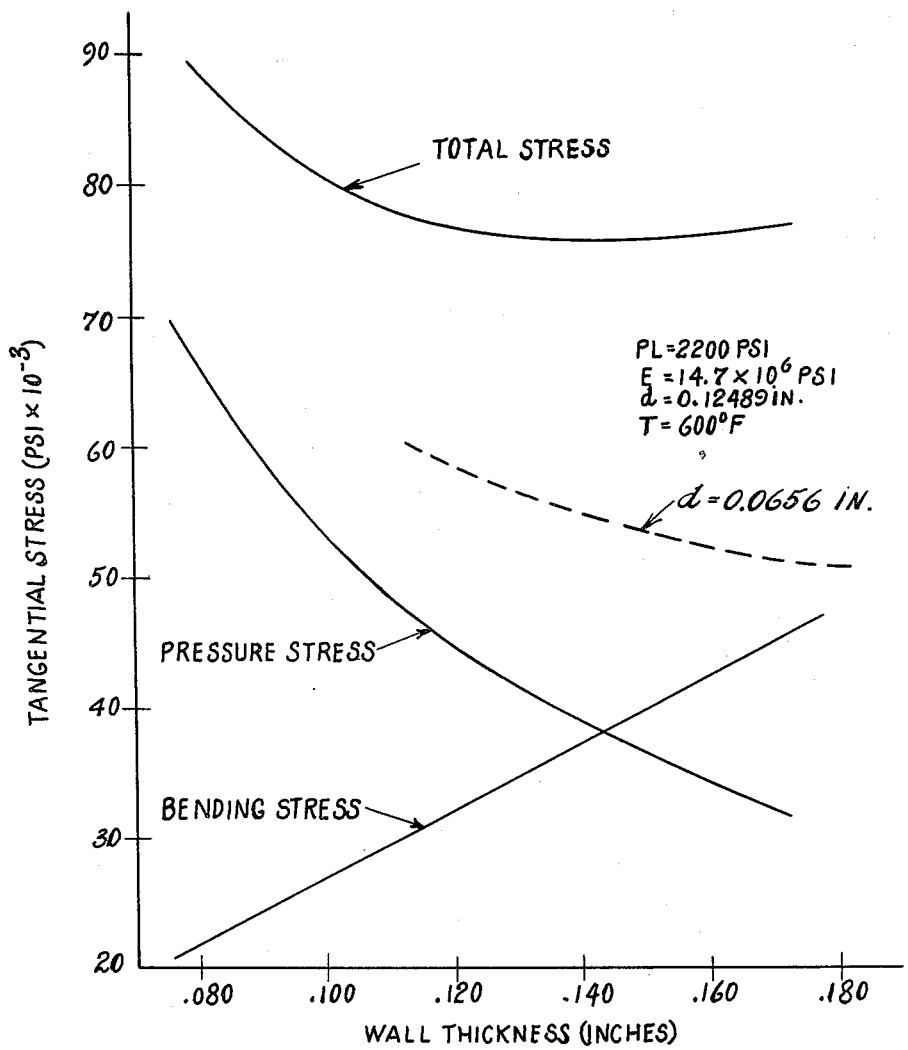

Figure 20a is a diagram of bending stress, pressure stress and total stress in terms of wall thickness of the strain tube.

Figure 20b is a diagram showing total tensile stress in terms of arc angle around the strain tube.

Figure 20c is a Soderberg diagram plotting alternating maximum shear stress against mean maximum shear stress for the strain tube.

Figure 21:
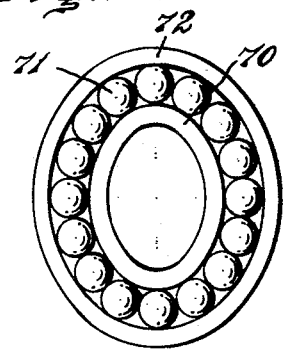
Figure 22:
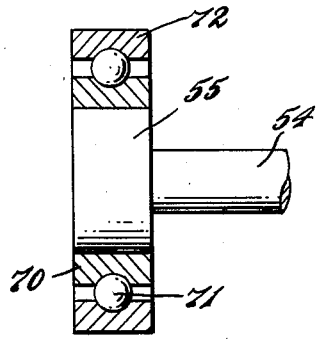

Figures 21 and 22 show an ellipsoidal ball bearing strain inducer, Figure 21 being an end elevation and Figure 22 an axial section.

Figure 23:
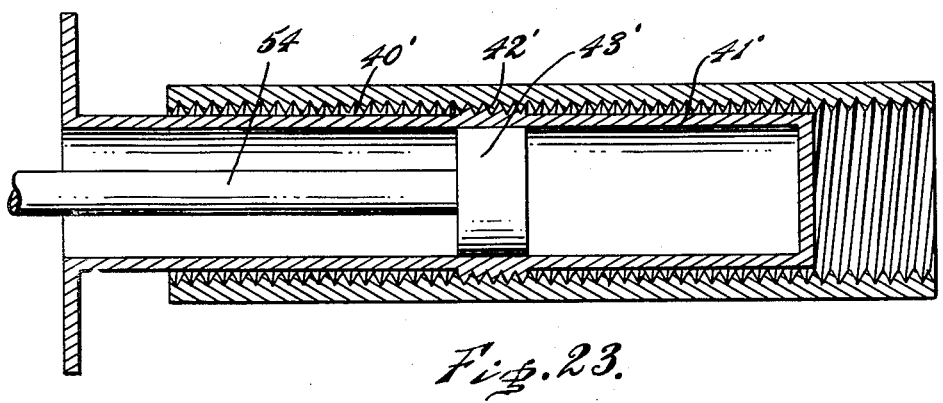

Figure 23 is an axial section showing a complete device according to the present invention.

Figure 24 is a diagrammatic central longitudinal section of a variable length push rod, link or connecting rod in accordance with the present invention.

Describing in illustration but not in limitation and referring to the drawings:

In the present day devices the transmission of motion through a sealed container is usually done by electrical induction or magnetic force or by movement through seals or diaphragms. The seals and diaphragms produce limited motion and higher pressures provide a limitation on the effectiveness of their use. As of the present time the most satisfactory devices have a sealed container interposed between the stator and rotor of a motor. In order to be satisfactory the motors must either be of a very large size or they must operate at moderate or high speeds. This introduces gear reductions within the sealed container and under the atmosphere of the pressure vessel. In addition, special ball bearings or other antifriction bearings must be used and the inability to supply lubrication not only limits their life but markedly increases the coefficient of friction. Where power is to be transmitted to produce a linear motion it is normal to rotate either a screw within a nut or a nut on a screw. Using a normal nut-screw relationship is completely unsatisfactory due to the inability to lubricate and the exceedingly high coefficient of friction encountered. In order to overcome the objections, ball bearing screws have been utilized but even in these the coefficient of friction is sufficiently high to prevent satisfactory operation.

Many of the prior art methods of transmitting motion necessitate the employment of complicated mechanisms inside the container, including levers, bearings, gears, nuts and screws and the like. The problem is very complicated where the operation within the container is likely to cause corrosion, contamination, elevated temperature, or interference with the mechanism.

By the present invention, it is possible to transmit motion through a hermetically sealed container wall, without limiting the character of the container wall to non-magnetic materials, and without greatly limiting the thickness. Furthermore, the mechanism is structurally of the utmost simplicity, so that elevated temperatures, corrosion, chemical reaction mixtures, elevated pressures and other similar conditions inside the container will not interfere with functioning even after prolonged service. Furthermore, by the mechanism of the invention, space inside a hermetically sealed container is conserved, as very few parts are employed, and the space required for moving parts inside the container is held to a minimum.

Strain wave linear actuation in accordance with the invention converts rotary motion into rectilinear motion by inducing a travelling strain wave to produce a plurality of engagements circumferentially between circumferential-groove or thread-like surfaces. The simplest general form employs a circumferentially grooved member or screw, a strain tube, and a strain inducer. Depending upon the particular service requirement, the circumferentially grooved member or screw may be on the inside of the strain tube, and the strain inducer on the outside, or the circumferentially grooved member or screw may be on the outside of the strain tube and the strain inducer on the inside. The circumferentially grooved member or screw in the preferred embodiment is threaded on the surface adjoining the strain tube in a manner similar to that of an ordinary screw or nut. The difference in the number of leads between the strain tube and the circumferentially grooved member or screw should be equal to or a multiple of the number of lobes on the strain inducer.

Cooperating with the circumferentially grooved member or screw are circumferential grooves or thread-like surfaces on the strain tube, which are of different lead from the circumferential grooves or threads on the circumferentially grooved member or screw. In many embodiments the circumferential grooves or thread-like surfaces on the strain tube may constitute simply rings rather than helices. It will, however, be evident that circumferential grooves or thread-like surfaces without any helix angle can be used on the circumferential grooved member or screw if circumferential grooves or thread-like surfaces having helix angles are used on the strain tube, the important feature being that there is a difference in lead between the circumferential grooves or thread-like surfaces on the circumferentially grooved member or screw and on the strain tube.

In some cases it is preferable to use left hand circumferential grooves or threads on one and right hand circumferential grooves or threads on the other of the strain tube and the circumferentially grooved member or screw, either having the left hand circumferential grooves or threads and the other having the right hand circumferential grooves or threads, but the difference in the number of leads between the two circumferential grooves or threads still being equal to or a multiple of the number of lobes on the strain inducer. Likewise both the strain tube and the circumferentially grooved member or screw can have left hand circumferential grooves or threads, or both can have right hand circumferential grooves or threads, as long as the same relationship exists between the difference of the number of leads and the number of lobes on the strain inducer.

For preferred operation of the device, the circumferential groove or thread form is a function of the pitch of the circumferential groove or thread and the deflection of the side wall of the strain tube with propagation of this deflection around the circumference as the strain inducer rotates. Any one of a wide variety of strain inducers may be used, as later explained, to apply the deflection and to propagate the wave form. The strain inducer may, where desired, provide a slight cam or helix lead on its effective surfaces to match or to maintain a predetermined relation to the helix lead on the circumferential groove or screw thread in those cases where the tubular member is the axially movable member. By this means it is possible to prevent rectilinear sliding motion between adjoining surfaces of the strain tube and the active surface of the strain inducer.

It will be understood that the strain tube may be the wall of a hermetically sealed container, or may be a portion or unit of such wall, and the deflection of the strain tube may be localized at a particular point or may extend indefinitely along the strain tube by correspondingly extending the strain inducer. If the stain tube is of sufficient length, it will be understood that different linear actuators can produce strain waves in the strain tube at different points for different purposes so as to provide a multiplicity of linear actuators, and the strain wave thus employed can be coordinated or wholly independent as desired.

A circumferential groove or thread-like surface on the strain tube may, of course, be integral with the tube or may be attached to or in any way secured to the tube.

It will, of course, be evident that the thickness of the strain tube will be related to the diameter, and it will be understood that strain tubes of appreciable thickness adequate to withstand substantial pressure differentials may be used where desired.

It will, of course, be understood that in order to reduce the pressure differential on the strain tube, the outside of the strain tube and the rotating element can be placed in a pressurized container maintained at a pressure intermediate between or equal to the pressure inside the hermetically sealed container.

To understand in a general way the functions of the device, as shown in the diagram of Figure 1, it will be assumed that the multiple lead circumferential grooves or threads are provided on the outside of the circumferentially grooved member or screw 40, which is internal to the strain tube 41, the strain tube having internal circumferential thread-like cooperating grooves 42. The strain inducer 43 is axially fixed and located around the outside of the strain tube by means not shown herein. The circumferentially grooved member or screw in this case is the linear moving member. The strain inducer may, for example, have two or more lobes or points of pressure engagement, as later explained. This may be accomplished by providing ellipsoidal form of the strain inducer.

It will be evident that since the strain inducer closely fits the adjoining surface of the strain tube, it will produce an ellipsoidal or deflected shape of the tubular member. As a consequence, when the strain inducer is rotated, this deflection of the strain tube will rotate around the circumference, producing a deformation akin to a wave, which makes the circumferential or thread-like grooves move radially in and out into and out of engagement with the circumferential grooves or threads of the circumferentially grooved member or screw as the strain inducer is rotated.

In initially assembling the circumferentially grooved member or screw into the strain tube, it will be understood that if the circumferential grooves or thread-like surfaces radially clear from one another when the strain tube is free from deflection, the circumferentially grooved member or screw and the strain tube can simply be axially manipulated without rotation. If the circumferential grooves or thread-like surfaces are such as to interlock, relative linear motion can be accomplished by rotating the strain inducer and thus assembling or disassembling the parts. Such relative linear motion can also be accomplished by rotating either the circumferentially grooved member or screw or the strain tube, or both, whichever is provided with a lead.

Rotation of the member not having a lead, while the other members are fixed, can be accomplished without producing axial motion. This will permit performing another function by rotation of such member. Thus in effect the strain tube can be a rotating tube which will function for independent purposes without interfering with operation of the linear actuator.

In the event that the strain wave is completely linear from its peak to its valley, the circumferential grooves or threads would be completely engaged with the circumferential grooves at the peak of the strain wave and fully disengaged and out of phase at points directly between the lobes of the strain inducer or at the valleys of the strain wave. If the circumferential groove or thread form on the face of the circumferential grooved member or screw and on the strain tube were a perfect V, the circumferential groove or thread would be in contact on opposite sides of the peaks of the strain wave at all times. The rotation of the strain inducer progressively moves this wave around the circumference of the strain tube. During the first half of the wave the teeth will be in engagement on one side of the peak and during the other half of the wave on the opposite side of the peak. Thus one portion of the wave will bear thrust in one direction and the other portion of the wave will bear thrust in the opposite direction.

In the preferred form the strain inducer is exterior to the tube. This produces an ellipsoidal form of the strain tube wall so that the circumferential groove or thread-like teeth are in contact or intermesh with the circumferential grooves or threads on the circumferentially grooved member or screw on the minor axis of the ellipsoid. Since the angle of the circumferential groove or thread-like surfaces gives adequate clearances as the tube moves away from the circumferentially grooved member or screw as it approaches the major axis of the ellipsoid, no interference with the pressure angle of the circumferential grooves or thread-like surfaces is encountered even though the grooves or threads of the two mating parts are of different lead. As the strain inducer is rotated it rotates the minor and major axes of the ellipsoid and causes progressive rotation of the interengagement points. One revolution of the strain inducer will then axially advance the circumferentially grooved member or screw in relation to the strain tube a distance equal to the difference in lead between the two members.

It will be evident, of course, that the materials used for the components may be any suitable materials, preferably metal, such as steel, bronze, titanium or other gear material, although permissibly elastomers such as rubber, synthetic rubber, nylon or other plastic will be used. It will be evident that the components of the strain inducer and of the circumferentially grooved member or screw need not be elastically deformable, and in the ordinary case will be rigid, while the strain tube should of course be elastically deformable to a limited extent, but preferably will be a hard and firm material.

ANALYSIS OF GENERAL PRINCIPLES

As already explained, in accordance with the invention, rotary motion of one of the elements is converted into linear motion of another element by the intervention of a strain wave traveling rotationally around the periphery of a relatively thin tube or ring and thereby causing progressive advancing interengagement of circumferential groove or thread-like surfaces between axially fixed and axially movable members.

As illustrated in Figure 2, the circumferentially grooved member or screw 40, in this case on the inside, is engaged by the circumferential grooved or thread-like surfaces on the interior of the strain tube 41 under the action of the strain inducer 43, suggested by the radial arrows and the circumferential arrows, which indicate the travel of the strain wave. The radial arrows may of course be represented by slide shoes or rollers or by a distorted antifriction bearing as later explained, as long as they inwardly deflect the strain tube until the pitch diameter of its teeth is tangent to the pitch diameter of the circumferentially grooved member or screw 40.

These engagement areas are rotated around the periphery of the strain tube. In many cases it will be preferable not to rotate the strain tube nor the circumferentially grooved member or screw, although of course it will be understood that we are concerned with relative motion, and as long as relative rotation is accomplished with respect to the strain inducer this is sufficient.

The strain tube in the form shown assumes an ellipsoidal configuration with the total radial deflection being one-half the difference between the major and minor axes. This different contour is described as ellipsoidal because it need not be truly elliptical and in some cases preferably will not be elliptical. This total radial deflection is designated as $d$ which is shown particularly in Figure 7. At the point of fullest engagement of the teeth, the pitch lines of the strain tube and the circumferentially grooved member or screw are tangent to each other as illustrated in Figure 5.

The pitch of the circumferential grooves or threads of the circumferentially grooved member or screw and the strain tube are the same, but the lead between the two differs by the number of contact points or lobes on the strain inducer or a multiple thereof.

Frequently the strain tube will have no lead, and as a consequence it is merely provided with circumferential grooves of thread-like contour as indicated in Figure 3. Cooperating with the thread-like grooves on the strain tube, as in Figure 3, is a double lead circumferentially grooved member or screw of the same pitch and the same circumferential groove or thread shape, as shown in Figure 4. It will be understood of course that the lead of the circumferential grooves or threads of the screw can be either right hand or left hand as desired.

Figures 6, 7, 8:
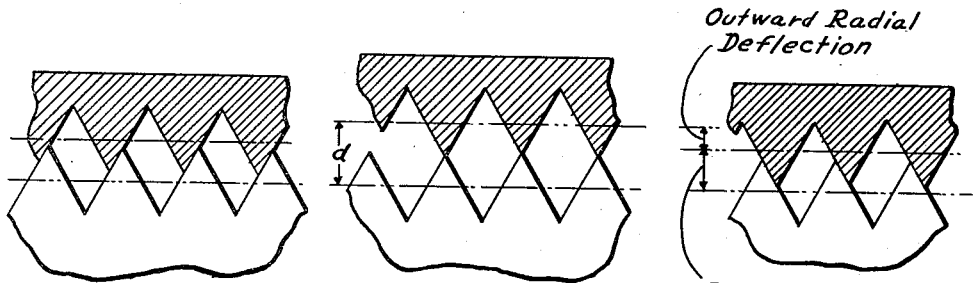

It will be understood that depending upon the character of the strain wave, various groove or thread contours may be used, but for purposes of illustration sharp V grooves or threads are shown. If we assume that the distance between the pitch diameters is zero at the positions of Figure 5, and that the distance increases to $d$ at the position of Figure 7, and is linear in respect to rotation of the strain inducer, it will be apparent that at 45° rotation, the position of Figure 6, the teeth will be half engaged and against one side. At 90° rotation as shown in Figure 7, the teeth will be fully disengaged and out of phase, aligned point to point. This position is called the cross-over point. On continuing the rotation, the teeth will move into each other on the opposite side as shown in Figure 8. The effect is to advance the circumferentially grooved member or screw in relation to the strain tube a distance of one thread for each 180° rotation of the strain inducer (it will be remembered that a double lead thread is used on the circumferentially grooved member or screw). While at first sight it may appear that the effect is one of cam-like surfaces sliding over each other, it has been found by rigid analysis that the motion is essentially rolling with a small percentage of sliding so that the device is highly efficient from the standpoint of low wear. This is caused by the non-linearity of the actual wave.

The curve of Figure 9 shows a point loaded deflection curve for a strain tube, and the match of this curve with a straight line drawn to intercept with 0 to 90° points at 1.44 times the total height of the wave. This curve has been experimentally determined on several strain tubes of different dimensions. As a typical example, over the usable portion of this curve it matches the straight line to within .0002 inch.

The following formula has been devised for this curve:

$$d = \frac{ER^3}{EI}\left(\frac{1}{\pi} + \frac{\phi \cos \phi}{4} - \frac{\pi \cos \phi}{8} - \frac{\sin \phi}{4}\right) \quad (1)$$

Where:
  $d$ = Total radial deflection
  $F$ = Applied force
  $R$ = Radius to center of ring
  $E$ = Modulus of elasticity
  $I$ = Moment of inertia
  $\phi$ = Angle of rotation The following table shows the correlation of the experimentally measured curve and the curve derived from Formula No. 1.

TABLE 1

| $\phi$ (Degrees) | $d$ (Cal.), inch | $d$ (Exp.), inch | Difference, inch |
|---|---|---|---|
| 0 | .03212 | .03212 | .00000 |
| 6 | .03166 | .03168 | +.00002 |
| 12 | .03036 | .03028 | −.00008 |
| 18 | .02837 | .02831 | −.00006 |
| 24 | .02580 | .02581 | +.00001 |
| 30 | .02290 | .02281 | −.00009 |
| 36 | .01972 | .01965 | +.00007 |
| 42 | .01642 | .01625 | −.00017 |
| 48 | .01315 | .01287 | −.00028 |
| 54 | .01004 | .00962 | −.00042 |
| 60 | .00720 | .00665 | −.00055 |
| 66 | .00473 | .00440 | −.00033 |
| 72 | .00271 | .00243 | −.00028 |
| 78 | .00123 | .00100 | −.00023 |
| 84 | .00031 | .00018 | −.00013 |
| 90 | .00000 | .00000 | .00000 |

For this particular wave the match is to within .00055" at the worst point. This mismatch is considered to be caused by (1) experimental wave was not point loaded, and, (2) R in formula is taken as a constant and it is a variable.

When it is desired to have a strain inducer in which the deflection of the strain tube can be controlled in shape and can be applied at will, the strain inducer shown in Figure 10 will desirably be used. In this form the circumferentially grooved member or screw 40, having teeth on the outside, is as shown surrounded by the undeflected strain tube 41, having teeth on the inside, which is in turn surrounded by a first antifriction bearing 44 having an inner race or bearing surface 45 having bearing elements 46 and an outer race or bearing surface 47. The components of the inner antifriction bearing as thus described will desirably be concentric to the axis. The inner antifriction bearing is surrounded by a bushing 48 having a circular inside diameter and an ellipsoidal outside diameter and this is in turn surrounded by an outer antifriction bearing 50 having an inner bearing surface or race 51, bearing elements 52 and an outer race or bearing surface 53. It will of course be understood that the positions of these races are ellipsoidal, conforming to the outside diameter of the bushing 48. The outer bearing 50 is surrounded by a strain inducer body 43 which is effectively rigid and has an inner horizontal surface conforming to the outer race 53 and suitably an outer circular surface which is attached to the driving means.

By rotating the point A of the inner bushing 48 to the position corresponding with the point B in relation to the strain inducer, the major axis of the inner ellipsoid is placed to coincide with the minor axis of the outer ellipsoid. Consequently the inner bearing is deflected by twice the ellipsoidality of either the inner bushing or the strain inducer. This is illustrated by the curves in Figure 11, where the differences between major and minor axis thickness of the bushing 48 and of the strain inducer 43 are the same but different in phase. The ellipsoidality in the bushing matches the ellipsoidality in the strain inducer body so that at one angular position they will cancel and form a circle. When the bushing is placed in phase with the strain inducer body, the ellipsoid at the inner bearing is deflected as shown by the dotted curve on Figure 11.

It will be evident that in any practical device embodying the form of Figure 10, provision should be made for clamping the bushing and the strain inducer body in any desired adjusted position.

If the normal or natural point loaded strain wave is used as indicated in Figure 9, in order to produce a circle it is necessary to orient the waves so that the loading point is coincident in the circular position. Then in the inner-bearing deflected position, the waves become reversed and the point loaded position is added to the position at 90° from the point loaded position.

This feature is highly desirable as it produces a wave shape that is desirably more uniform in its stress pattern due to the maximum stress point of one being superimposed over the 90° stress point of the other which is approximately 60% as great. The final wave produced will desirably be completely symmetrical.

The curve shown in Figure 12 is produced by adding two point loaded out of phase deflection waves. This curve is completely symmetrical and the 45° rotation point goes through the 0 degree deflection point. For this curve, particularly using scrammable or releasable circumferentially grooved member or screw form, the optimum straight line relationship appears to be $1.100d$. While this appears to produce a greater mismatch, than the $1.44d$ wave of Figure 9, it has been calculated that with but a small increase in surface contact stress, the entrance clearance and the length of tooth engagement at the contact point are greatly increased. Reducing this $1.100d$ dimension as shown in Figure 12 still further, however, objectionably increases the tooth pressure angle. When the tooth is constructed in this manner the maximum deviation from the straight line is $$0.07286\, d \sin\left(\tan^{-1} 0.4545\, \frac{p}{d}\right)$$

or about 0.003 inch for a deflection of 0.125 inch.

In normal usage this wave is usable from 5° to 85°, or for 80° of the curve. This is 88% of the curve. When it is desired to have the strain tube releasable from the circumferentially grooved member or screw, the tooth height is lessened and the usable portion of the curve is from 5° to 42½° or 37½° which is 42% of the curve. This allows 2½° for clearance and tolerance purposes.

Since this curve is formed by deflecting a strain tube inwardly by a positively formed rotating bearing race, even if there is a slight clearance between the tube and the bearing, the portion of the curve used for the releasable circumferentially grooved member or screw will be correct, and the outwardly deflected portion will be slightly rounded and to a lower stress and strain.

The formula for the wave in Figure 12 is:

$$d = \frac{FR^3}{EI}\left[\frac{\phi}{4}(\sin\phi + \cos\phi) - \frac{\sin\phi}{4} - \left(\frac{\pi}{8} - \frac{1}{4}\right)\cos\phi\right] \quad (2)$$

The tooth shape can be calculated from the curve in Figure 12 to obtain the proportions shown in Figure 13. Using the $1.10d$ line which was chosen to give a large usable portion of the strain wave, the tooth angle is derived from the following equations:

$$\text{tooth angle} = \tan^{-1}\frac{.5p}{1.10d}$$

$$= \tan^{-1} .4545\frac{p}{d} \quad (3)$$

Since the tooth is moving along this $1.10d$ line, the sides of the teeth are plane surfaces. The addendum for the tooth is calculated in Figure 13, for the scrammable or releasable circumferentially grooved member or screw condition. For the normal or non-scrammable condition, the addendum is about $7/16d$.

In Figure 13 the addendum is $0.250d$ to allow the teeth to clear with the strain tube in the release or relaxed condition. Since the pitch diameter of the strain tube is $d$ larger than the pitch diameter of the circumferentially grooved member or screw, the maximum addendum for passing is $0.250d$.

The thickness of the tooth at the pitch diameter line is chosen to make the teeth on the strain tube of the same form as the teeth on the circumferentially grooved member or screw.

Since the teeth on the strain tube at the maximum deflection toward the circumferentially grooved member or screw are not in contact with the teeth on the circumferentially grooved member or screw, but are moving from one side of the circumferential groove or screw teeth to the other, this clearance must be deducted from the conventional 50% of pitch tooth thickness. This clearance is calculated by the height of the $1.10d$ line above the deflection curve which is $0.05d$. Referring this to terms of $p$ we get:

$$\text{clearance} = \frac{.5p \times .05d}{.55d}$$

$$= .04545p$$

and the uncorrected tooth width $= -(1-.0455) = .4772p$

To allow for the shift in the tooth position caused by the mismatch of the $1.10d$ line with the curve, a function of the mismatch is subtracted from the tooth width:

corrected tooth width $$= .4772p - \frac{.07286d\,\sin\,(\tan^{-1}\,.4545p/d)}{\cos\,\tan^{-1}\,.4545p/d}$$

$$= .4772p - .0331p = .4441p \quad (4)$$

A tooth manufactured exactly to conform to these configurations would produce metal to metal contact between the strain tube and the circumferentially grooved member or screw if the inward deflection were at a maximum. Since these contact points are about 44° apart, and any load deflection is shared between the strain tube and the circumferentially grooved member or screw surfaces at eight surfaces, these dimensions are chosen as the maximum tight condition and all tolerances add clearance. Figures 14a to 14ee illustrate a progression showing the motion of the circumferential groove or thread-like surface 42 on the strain tube 41 to the circumferential groove or thread-like surface on the circumferentially grooved member or screw 40 as a function of rotation of the strain inducer for the releasable and scrammable condition. For the nonreleasable or non-scrammable actuator, the teeth would be longer and would become engaged at about the 75° point. This is shown by the dotted tooth extension at the 75° position.

If it be assumed that there is no load deflection, the slight curvature on the strain wave curve produces a small entrance clearance which tends to trap any lubricant between the faces of the teeth. As the teeth enter into each other, this clearance gets progressively less until the surfaces "kiss" at about the 22° point. These surfaces are separated by the entrance clearance amount and the teeth start moving over to the opposite tooth face at about 5°.

If the strain wave were triangular as assumed in Figure 2, the tooth would remain in contact until the 0° point. However, since the strain wave departs from the straight line after the contact point, the deflection proportionately decreases and the teeth separate from each other. They then move over to the opposite tooth face and are in a position to contact it at about 355°.

These tooth relationships are shown for the $1.10d$ proportions as calculated herein. This allows an axial surface and tooth deflection of $0.033p$ (or 0.003 inch for a 0.100 inch value of $p$) before the total load bearing surface is utilized. Decreasing the $1.10d$ proportions increases this surface and tooth deflection to obtain the total bearing surface.

While the teeth in these views have the appearance that they are sliding into each other, they are actually rolling into the position shown by a minute change in circularity of the strain tube. The progression of the tooth contact is actually proceeding in a plane perpendicular to the views of Figure 14 with a small radial component increasing or decreasing the tooth engagement. This small radial component is illustrated by the relative movement in Figure 14.

In Figure 15 the contact parameters between the circumferential grooves or threads on the circumferentially grooved member or screw and the circumferential groove or thread-like surface on the strain tube are examined. This diagram is taken normal to the contact pressure plane of the circumferential groove or screw thread along the developed outside circumference of the circumferential groove or screw. The contact line is the point of actual line contact between the circumferential grooves or thread-like surfaces on the strain tube and the circumferentially grooved member or threads on the circumferentially grooved member or screw for the no-load conditions. A difference in circularity causes the surfaces to have a small clearance at all other locations which, at the entrance of the teeth into each other and 37°48' later, is $$0.07286d \sin\left(\tan^{-1} 0.4545\frac{p}{d}\right)$$

Effectively under load the surface loading is equivalent to a roller of the diameter shown in Formula 10, Table 2 on a flat plate. For a 3.70 inch diameter circumferentially grooved member or screw with a 0.125 inch deflection this would give an equivalent roller diameter of 142 inches.

The progression of tooth contact from one point to another can be likened to the behavior of a track-laying vehicle. The track which is analogous to the strain tube is in stationary contact with the earth which is analogous to the circumferentially grooved member or screw, and is rolling forward by laying down a new section of track. If we consider that this vehicle track is sliding slightly to the side and in the direction of motion, the analogy will be more exact.

The progression of tooth contact is brought about by minute changes in curvature and constitutes almost pure rolling. For example, the advance of tooth rotation is $$\frac{\pi D}{360°}$$

where D is the pitch diameter of the circumferentially grooved member or screw. The radial slippage between the surfaces is the height of the triangular deflection or $1.10d$ and takes place in 90°. Because it is $0.012d$ per degree rotation, the tangential slippage per degree is caused by the difference in circumference and is $$\frac{\pi d}{360°}$$

or $0.0087d$. The resultant or total slippage is $0.015d$. Dividing this by the tooth progression per degree and multiplying by $10^2$ gives the percentage of slip. Thus, for a circumferentially grooved member or screw having a diameter of 4 inches with a deflection of 0.125 inch the percentage of slip is 5.4.

Figure 16 graphically portrays the slippage from the radial movement which is caused by the movement of the teeth radially into each other. The slippage from tangential movement is brought about by the difference in circumference of the pitch diameters of the circumferentially grooved member or screw and the strain tube. The vector analysis gives the resultant slippage of these two. However, while this slippage is occurring the forward progression of the contact point has gone a considerably greater distance so that the proportions indicated in Figure 16 are illustrative of the rolling versus the slippage.

The contact between the teeth is along a line extending across a portion of a crescent shaped area as illustrated in Figure 17. As pointed out in Figure 15, this contact line is the result of two circles of nearly equivalent radius, and in load bearing ability is effectively the same as a huge roller operating on a flat surface. When the applied load produces a surface and tooth deflection totaling $$0.07286d \sin\left(\tan^{-1} 0.4545\frac{p}{d}\right)$$

the area of contact extends through the crescent like portion. This is the maximum allowable deflection for the proportions selected herein. Exceeding this deflection will cause interference between the teeth at the point where they enter each other and cause a shearing action at the edges for the scrammable version of the device. To increase the load-bearing capacity, additional teeth are used, or the $1.10d$ slope relationship to the curve can be reduced to increase the allowable maximum deflection. This would be accomplished by increasing the entrance clearance due to the greater mismatch.

The angular dimensions in Figure 17 represent the angular position of the crest of the strain wave or the angular relationship with the point of greatest inward deflection caused by the strain inducer. Without clearance, tooth entrance would start at 45°, but clearance and tolerance reduces this entrance point to 42.5°. The relationships throughout Figure 17 are for the scrammable form.

A graphical means of illustrating tooth engagement proportions is shown in Figure 18. The $0.55d$ dimension is one half of $1.10d$ or the height of the straight line triangle formed by one half of one side of the wave. The rotation of the strain inducer corresponding to this height is 45° and the teeth are interengaged for 37°48' with 2.5° allowance for clearance and tolerance. The other calculations involved are derived algebraically and geometrically.

The maximum fiber stress in a strain tube point loaded to produce a deflection as depicted in Figure 9 is in accordance with the following formula:

$$\sigma_{PL_0} = 1.07 \frac{d_1 t E}{r^2} \quad (13)$$

This maximum stress is on the inside of the strain tube directly under the point load and is in tension. Since this is for a sharp point load, it is questionable whether actual mechanically produced waves are stressed to this degree as the load is applied from an area instead of a point. 90° from this position the inside surfaces are in compression to the amount shown by the following formula:

$$\sigma_{PL_{90}} = .61 \frac{d_1 t E}{r^2} \quad (14)$$

When the negative and positive portions are mechanically added to each other to produce the curve shown in Figure 12, the curvature and stress produced at any point should be intermediate between the curvature and stress on the corresponding point loaded curves. For this resultant curve the points of maximum stress are expressed by the Formula 15:

$$\sigma_R = .875 \frac{d_1 t E}{r^2} \quad (15)$$

The actual value is believed to be somewhat lower than this value since neither of the curves being added will be point loaded. Careful analysis of the stress pattern in the strain tube is shown in Figure 19. For the resultant wave the stress is almost a linear function of angular position. However, since this wave is calculated from the formula of point loading, it has a sharp reversal as it crosses the 0° and 90° angular position. For the actual area loading condition this reversal would be rounded with a consequent lowering of peak stress and a slight distortion to other portions of the curve.

The nomenclature used is as follows:
- $\sigma_{PL_0}$ = Max. tension under load
- $\sigma_{PL_{90}}$ = Max. compression 90° from load
- $\sigma_R$ = Max. fibre stress of resultant wave
- $d_1$ = diametral deflection
- $t$ = Tube or ring thickness
- $r$ = Radius of tube or ring
- $E$ = Modulus of elasticity The values for the maximum stresses in the strain tube with the tube under an internal pressure were calculated for various tube diameters and thicknesses. Formulae were developed showing the optimum wall thickness for a given pressure and deflection. From these it became apparent that the wall thickness actually increases as the transient stress wave stresses are reduced when it is desired to obtain the minimum stresses in the wall. This produces a tube which is somewhat thicker than otherwise required to confine the pressure with a consequent increase in factor of safety. These calculations, however, were based on the point loaded curve. The curves summarizing the values derived in the above calculations appear in Figure 20. The values of stresses shown in these curves are comparative to each other only. These curves illustrate the approximate slope and stress values for the combined stresses of internal pressure and transient stress wave flexure. They are for tubes of various diameters composed of a single tube, a double sleeve tube, and a triple sleeve tube. For example, for a triple sleeve 4 inch diameter tube under the conditions outlined above, the stresses are about 60% of those of a single sleeve tube.

When the resultant stress wave shape is used, the stresses are ordinarily sufficiently low to permit the use of a single tube.

Those factors which are capable of producing operating stresses on the strain tube are pressure, deflection and temperature. Under proper design conditions, thermal effects can be rendered negligible in those areas where pressure and deflection are most important factors. The significant pressure is hoop tension on the inner surface of the strain tube. The stress due to deflection is bending stress which is in the same plane as the pressure stress and is therefore superimposed on the pressure stress. The pertinent relationships indicate that for constant conditions of tube internal diameter, deflection and internal pressure, the pressure stress decreases and the bending stress increases with increasing wall thickness. Since the total stress imposed on the strain tube is the algebraic sum of these values, a wall thickness can be found which gives the minimum total stress. This optimum wall thickness from the standpoint of total stress is obtained when the pressure and the bending stresses are equal. Because the stress due to pressure is a steady state condition and the stress due to bending is an alternating condition, the wall thickness giving the minimum total stress is not necessarily the most desirable value in all cases.

Figure 20a plots pressure, bending and total stress as a function of wall thickness, the other conditions being as specified on the diagram. The total stress curve is nearly horizontal over a wide range of wall thickness. Since it is desirable to keep the alternating component at a relatively low level to reduce the stress oscillation, a wall thickness of 0.100 inches has been selected. This establishes the pressure stress as 48,800 p.s.i. and the maximum bending stress as 29,700 p.s.i.

Figure 20b illustrates the total stress of the inside surface of the tube as a function of the angle around the strain tube. Since the strain wave rotates around the tube at an angular velocity during the operation, the abscissa is also a time scale. This curve shows that the imposed stress varies from a maximum of 78,500 p.s.i. to a minimum of 19,100 p.s.i. This amplitude of stress oscillation makes the indicated wall thickness more desirable than one which produces minimum total stresses, for a large gain in decrease of oscillation is obtained at a small sacrifice in maximum total stress, thus offering the advantage of better fatigue properties. This stress pattern produces discontinuity in the curve every 90 degrees. The cause of the discontinuities is the use of point loaded conditions which are primarily of theoretical consideration. Actual area loading, even over a small area, rounds the curve at these points and thus reduces the peaks. Other portions of the curve are slightly distorted under area loading.

A Soderberg diagram is shown in Figure 20c constructed according to General Electric Company Memorandum on Structural Design Basis, S.A.R. Reactor Components, by W. E. Cooper (November 15, 1955). The ordinate and abscissa for the Soderberg line were established from the relations described in the above memorandum and the properties of the particular material. This diagram is based on shear strength and maximum shear theory of failure. The steady state pressure stress is determined from an equation in the memorandum which relates wall thickness to Soderberg line abscissa value. The alternating stress used on this diagram is one half the bending stress, which is the maximum shear stress corresponding to a tensile or compressive stress of this value. A curve has been plotted for the range of safe wall thicknesses as defined on the figure. It will be evident that a suitable value for wall thickness can be made to lie within this safe area.

The effective pitch line of the strain tube varies radially from the center as the strain inducer is rotated. Coincidence between the pitch line of the screw and the strain tube occurs only at the extreme top or crest of the wave. The thread on the strain tube at the pitch line will move radially in and out as the strain inducer progressively advances the wave. After the strain inducer is moved $$\frac{360°}{2n}$$

where $n$ is the number of lobes, the thread will be displaced radially toward the center by a distance equal to the deflection.

Figure 14:
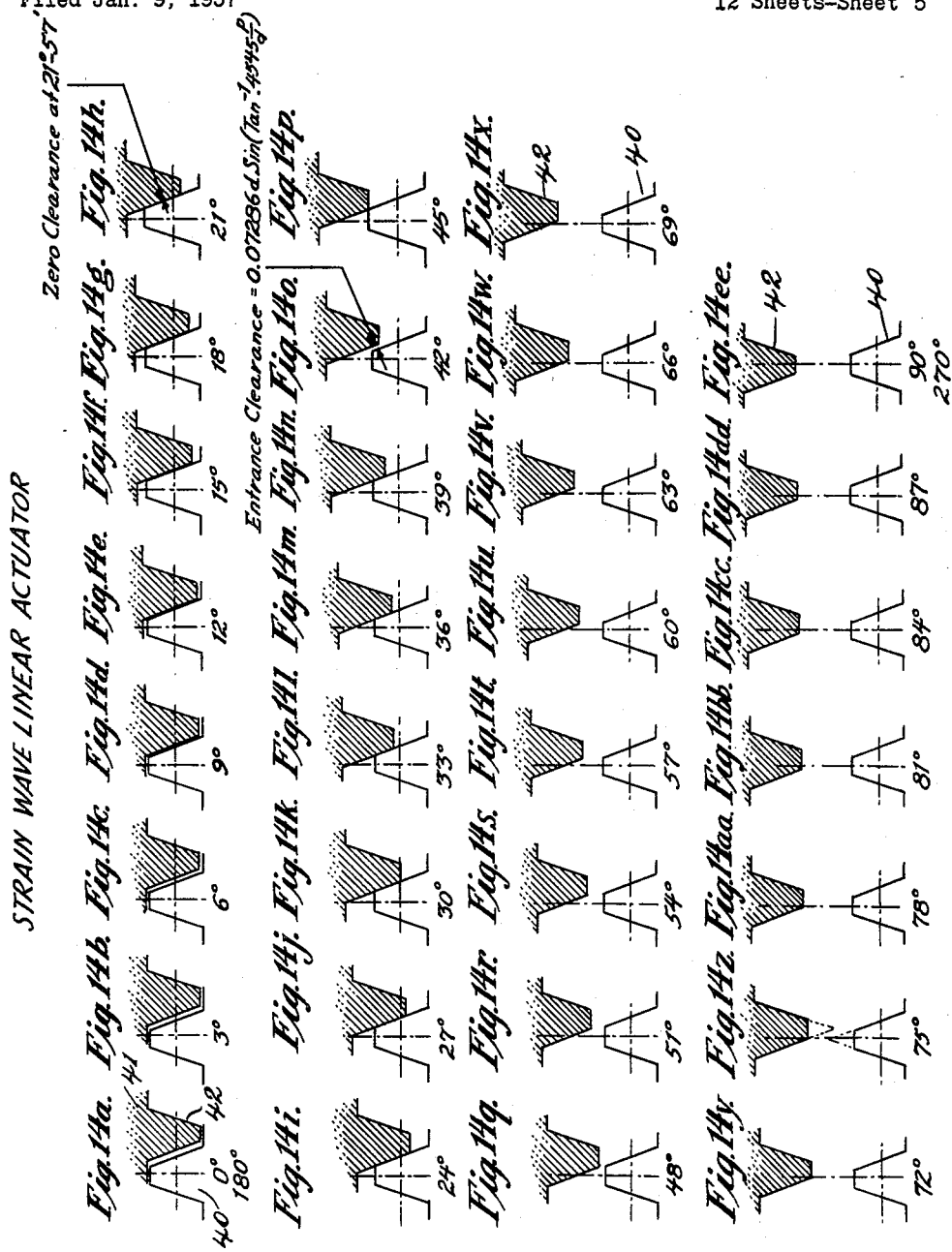

It has been determined that the shape of the strain wave also described the theoretical shape of the circumferential groove or thread. While these waves are the same in form, they are of entirely different scale. By representing the wave length as being equal to the pitch, it is easier to visualize circumferential groove or thread relationship. In Figure 14, thread deflection is plotted in relation to the pitch center line of a circumferential groove or thread as it is moved along such a wave and illustrates the relative position of mating circumferential grooves or threads throughout their travel. It must be remembered, however, that axial thread movement equal to the pitch requires a rotation of the strain inducer of $$\frac{360°}{n}$$

The axial increment of the strain inducer for the circumferential groove or thread positions shown in Figure 14 is 90°.

Figure 13 illustrates that at the crest of the wave when the two pitch lines are coincident, the circumferential grooves or threads are fully meshed and are not in contact with each other. This would be evident by considering the relationship of the fully engaged circumferential grooves or threads in Figure 14. The space on each side of the strain tube circumferential grooves or threads is not clearance but is the space necessary for the circumferential grooves or threads on the strain tube to travel from one side of the circumferential groove or thread space to the other side. This is caused by the non-linearity of the strain wave in respect to arcuate angle. While travelling a distance equal to the pitch, a thread on the strain tube progressively goes through the following cycle:

(1) 47.5° travelling from the dividing line of the adjacent circumferential groove or thread space to the circumferential groove or thread contact area of the thread space it is entering.

(2) 37° 48′ travelling along the circumferential groove or thread space area on the entering side of the circumferential groove or thread space. The actual contact surface during this travel is dependent on load.

(3) 9° 24′ travelling from the circumferential groove or thread contact area in the entering side of the circumferential groove or thread space over to the opposite or exiting thread side.

(4) 37° 48′ travelling along the circumferential groove or thread contact area on the exiting side of the circumferential groove or thread space.

(5) 47.5° travelling from the exiting side of the circumferential groove or thread contact area to the dividing line with the next circumferential groove or thread space.

Since the circumferential groove or thread is not in contact at the crest of the wave, backlash is easily controllable by providing a means for adjusting deflection. It is quite possible, in accordance with the invention, to produce a construction having zero backlash. Also, this cycle of operation tends to pump lubrication to the working surfaces.

The pitch line of the strain tube in relation to the circumferential groove or thread is always the same, but the pitch line in reference to the center of the circumferentially groove member or screw varies in accordance to its position on the strain wave. While the strain tube is in the strained condition this pitch line is at all times coincident with the strain wave. It is from this effective pitch line that all calculations are made with the exception of the dimensions about the circumferential groove or thread in the relaxed or unstrained condition. Inducing the wave into the strain tube tends to slightly modify the periphery of the tube. Hence the relaxed pitch diameter does not exactly equal the pitch diameter of the circumferentially grooved member or screw plus deflection. For practical consideration the amount of difference can be ignored or advantageously utilized as the tolerance for the circumferentially grooved member or screw and tube pitch diameter. Then circumferential grooves or threads made to the center of the tolerance limits will be theoretically correct.

DISTINCTIVE FEATURES

The radically different principles, upon which the operation of the strain wave linear actuator depend, produce parameters differing considerably from those normal in conventional threads. These differences are outlined and discussed in the following paragraphs.

Adjustable freedom from backlash

Circumferential groove or thread interengagement in the strain wave linear actuator is the result of the radial deflection of the relatively thin strain tube. Engagement is on both sides of the crest of this deflection, with the circumferential groove or thread contact area on the strain tube on the side toward the crest of the wave. Directly at the crest of the wave and for a substantial distance on each side, the circumferential grooves or threads are in mesh but not in contact. By making the strain inducer capable of adjusting the deflection, a circumferential groove or screw system with backlash can have it removed by increasing the deflection to the point where the crest of the wave is radially deflected further into the mating circumferential groove thread spaces until the circumferential groove or threads are in contact in both circumferential directions with respect to the crest of the wave.

This partially destroys the theoretical circumferential groove or thread relationship. However, in the strain wave linear actuator, this does not have a marked deleterious effect, as the change in angle from the theoretical mating surfaces is minute. Since the strain tube is a relatively thin threaded element, or element provided with circumferential groove or thread-like surfaces, by increasing the deflection the crest can be made to "spring load" the contacting screw by changing or skewing the shape of the strain wave. A slight amount of this readjustment is desirable to eliminate all backlash and preload the strain tube to assure freedom from backlash after high spots on the teeth have been worn away. Increasing the deflection beyond a moderate spring load, however, is not recommended due to the added stresses imposed on the strain tube at the crest of the wave.

It has been experimentally ascertained that a linear strain wave system can be easily made free of all backlash without marked increase in input torque.

Precise transmission of motion

The strain wave linear actuator gives very precise transmission of motion since the relative positions of the parts are determined by the engagement of a number of circumferential groove or thread-like surfaces at any time.

A number of factors contribute to the precise transmission of motion, including the adjustable freedom from backlash, the uniformly distributed wear, the balanced forces, and the insensitivity to circumferential groove or thread-shape.

Uniformly distributed wear

Each revolution of the input brings every portion of the circumferential groove or thread-like surfaces on the strain tube into active engagement with mating circumferential grooves or threads on the circumferentially grooved member or screw. This tends to reduce differential wear. The large area in contact and small percentage of sliding contact also tend to distribute the wear over the circumferential groove or thread-like surfaces. Incorrectly positioned or proportioned circumferential groove or thread-like surfaces will receive a disproportionate amount of wear tending to correct any defects. Subsequent wear will be uniformly spread over all of the circumferential groove or thread-like surfaces.

Small circumferential groove or thread motion

In the device of the invention the circumferential groove or thread-like surfaces move radially in and out of engagement. Their total travel is equal to the deflection and they are in contact with mating circumferential groove or thread-like surfaces for a substantial portion of the deflection. This feature offers advantages in respect to ease of lubrication.

Balanced forces

Since all of the forces are distributed at a number of equal points equal to the number of lobes on the strain inducer, the effect is to balance one another. This effectively prevents any radial forces being imparted to bearings or the like as the structure tends to be self-centering. The strain inducer likewise exerts balanced forces. All of the active forces within the strain wave linear actuator are balanced so that they tend to produce only the desired effect.

Low circumferential groove or thread sliding

For a small circumferential groove or thread moving radially in and out for a distance only equal to its height, a very low circumferential groove or thread sliding velocity can be obtained. The maximum circumferential groove or thread sliding velocity required is in any case very low.

Surface contact

The active profile on all of the circumferential grooves and threads is a plane surface in developed form. As the circumferential groove or thread on the strain tube approaches the mating circumferential groove or thread on the screw, it is canted slightly so that its active profile is parallel with the active profile of the circumferential groove or thread it is entering. It then slides into and along this active profile until it approaches the crest of the strain wave. It then leaves this side, and, while travelling over to the other side, it changes its cant so that the opposite active profiles become parallel just as they come into contact. For the balance of its contact it is sliding over these active profiles. At no time, other than the exact moment of circumferential groove or thread engagement, is there a line or point contact. This area contact is therefore a very important aspect of the invention. Half of the area contact is load bearing in one direction and the other half of the area contact is load bearing in the other axial direction. This large area in contact reduces the surface pressure to a low level, and at the same time makes it possible to bear greater loads than would be the case otherwise.

Sinusoidal circumferential groove or thread motion

The shape of the strain wave is similar to a sine wave. This effectively eliminates all shock as the circumferential groove or thread-like surfaces gradually decelerate to zero radial velocity after passing the circumferential groove or thread-contact area. They then accelerate in the opposite direction up to the point of circumferential groove or thread engagement. During circumferential groove or thread engagement they are moving essentially at constant velocity. This action is similar for both ends of the radial circumferential groove or thread travel.

High bearing area

In an ordinary circumferentially grooved member or screw and nut combination, there is relatively an enormous bearing surface in engagement between the circumferential grooves or threads of the circumferentially grooved member or screw and the nut, but the contact is pure sliding contact. In the strain wave linear actuator on the other hand, the bearing area is much reduced, and the contact is rolling contact. As compared with other rolling friction devices such as ball bearing screws and roller collar nuts, the bearing area is relatively high. Also the self-centering action as above discussed is advantageous in reducing the need for bearings. In general bearings only need be used to withstand forces applied from the outside.

High efficiency for moderate ratios

Because of the ease of lubrication, and the effect of the design, a very high efficiency is obtained in the strain wave linear actuator for moderate ratios.

Few parts

The entire unit can be made with three main parts, the strain tube, the screw and the strain inducer.

Ease of lubrication

The low tooth sliding velocity and short travel are probably the two greatest contributors to simplifying the lubrication problem. Also the circumferential grooves or threads move radially in and out, tending to distribute throughout the entire circumferential groove or thread surface by capillary action any lubricant that is present. Since the travel of the circumferential groove or thread on the active profile is only a short distance before it moves to a more advanced position, there is no replenishment problem—the circumferential groove or thread does not slide far enough to force out all of the lubricant. In addition the lubricant at the top of the circumferential groove or thread get spread over the entire active profile as it moves into place.

Small size

A strain wave linear actuator has a large capacity for a given size.

Ease of manufacture

The circumferential groove or thread-like surfaces used in the strain wave linear actuator can be cut in quantity production. Since the strain tube is deflected in service, out-of-roundness has no serious effect. Slight variations in dimensions or contour of the circumferential groove or thread-like surfaces can be compensated for by altering the deflection upon adjustment of the strain inducer. The usual problem of center position does not arise, since the balanced forces tend to keep the tubular members coaxial. In moderately loaded units, neoprene or nylon can be used for the strain tubes.

Light weight

Light weight is the result of few parts and small size.

Coaxial input-output

One of the advantages of the invention is that the input and output can readily be placed in coaxial relationship.

Insensitive to misalignment

Misalignment of the circumferential groove or thread-engaging faces is relatively unimportant as the strain tube is in any case deformed into engagement with the circumferentially grooved member or screw.

Differential motion insensitive to eccentricity and circumferential groove or thread shape While circumferential groove or thread shape and eccentricity can affect the area of contact, the linear motion produced is largely independent of circumferential groove or thread shape. The tooth contact surface rolls along the helix line of the teeth as it is advanced by wave progression and differential motion is thereby produced.

Distributed stresses

One of the highest stress points in strain wave linear actuators is the surface of the strain tube at the crest of the wave. Fortunately, the stresses introduced into the strain tube upon the transmission of linear motion are not applied at the crest of the strain wave but instead are on the side of the wave where there is practically no stress from the deflection. Consequently the tension and compression stresses are at the base and crest of the wave and the shear stresses are at an intermediate position. They are therefore not additive.

Thermal capacity

Unfortunately, as the consequence of small size and light weight, the thermal capacity of the strain wave linear actuator will in many cases be its limiting characteristic. This would indicate that in order to realize its potential capacity from other standpoints, cooling may in some cases be necessary.

BASIC FORMS

In the preceding explanation of the strain wave linear actuator, the mechanism has in a number of instances been considered as if a two lobe ellipsoidal cam was sliding directly on the strain tube. This simplified form facilitates explanation of the basic principles. However, there are many possible variations for the strain inducing element, each one having its own particular advantages. In several of the forms described below the strain inducer is internal, acting outwardly on the strain tube against an internal circumferential groove or thread on the circumferentially grooved member or screw rather than the reverse as discussed above.

In my patent above referred to, various forms of strain inducers are shown, having two lobes or three lobes as desired.

A strain wave linear actuator using ordinary bearings has the advantage of being self-locking. It is particularly resistant to shock and rigid as it positively holds the circumferential groove or thread engagements. This type of structure is however only usable in slow moving, properly lubricated applications, if best results are to be obtained, due to the relatively low efficiency which is of the order of 25 to 50 percent depending upon the coefficient of friction.

By using a ball bearing for the strain inducer, as already described, or as illustrated in Figures 21 and 22, the coefficient of friction can be materially reduced with a resulting increase in efficiency. This construction shows an arbor 55 on a shaft 54, and the arbor is of the desired strain inducer form and engages the inside of an inner bearing race 70 which receives bearing balls 71 in a suitable groove, the balls being held on the outside by an outer race 72 having a cooperating internal ball engaging groove. Since the balls closely fit the races, by expanding the inner race to an ellipsoidal shape, the outer race is expanded to a similar shape. Rotation of the inner race will then send a wave around the outer race. Careful measurements have shown that the wave form generated in this manner is largely identical with that generated by two-lobed plain strain inducers. For best results, in order to insure correct wave generation, there should be at least 36 balls in the bearing. The outer race should be thin enough to prevent it from being stressed beyond the endurance limit, and the inner race must be able to withstand the initial deflection. Expanding the bearing causes the balls to have added clearance except at the crest of the wave. As the bearing is used to transmit torque, the load is shifted to the side of the wave, and if heavy loads are to be handled, the inner race should be supported for at least 60 degrees on each side of the crest to prevent it from deflecting under this load. If a bearing is used with a loading slot, this slot should be placed on the major axis of the inner race.

As already explained, the strain tube can have external circumferential groove or thread-like surfaces engaging internal circumferential groove or thread-like surfaces on the circumferentially grooved member or screw (which in this case resembles a nut) with the strain inducer inside, or the structure can be reversed with the strain inducer outside. The form with the strain inducer on the outside has been illustrated in Figure 1. Figure 23 shows the form with the strain inducer on the inside, in which case a strain inducer 43' acts against the interior of a strain tube 41' having external circumferential groove or thread-like surfaces 42' and at the lobes engaging the interior circumferential grooves or threads on the circumferentially grooved member or screw 40'.

As already explained, a wide variety of selections can be provided as to whether the input is on the strain inducer or on the circumferentially grooved member or screw or on the strain tube, and the output on one or both of the other members.

It will be evident that in various installations the following possibilities exist regarding the device of the invention:

(a) Where the strain inducer is the element rotatively driven from an external source, the generation of one of the following:

(1) Circumferentially grooved member or screw driven linearly with the strain tube stationary, rotating or moving linearly.

(2) Strain tube driven linearly with the circumferentially grooved member or screw stationary, rotating or moving linearly.

(3) Both strain tube and circumferentially grooved member or screw driven linearly.

(4) Either member having a lead on its circumferential groove or thread-like surfaces being driven rotatively with the cooperating member stationary, rotating or moving linearly.

(b) Where the strain tube is the element linearly driven from an external source, the generation of one of the following:

(1) Strain inducer driven rotatively with the circumferentially grooved member or screw stationary, rotating or moving linearly.

(2) Circumferentially grooved member or screw driven linearly with the strain inducer rotatively determining relative linear position between circumferentially grooved member or screw and strain tube.

(c) Where the circumferentially grooved member or screw is the element linearly driven from an external source, the generation of one of the following:

(1) Strain inducer driven rotatively with the strain tube stationary, rotating or moving linearly.

(2) Strain tube driven linearly with the strain inducer rotatively determining relative linear position between the circumferentially grooved member or screw and the strain tube.

(d) Where either member having a lead on its circumferential groove or thread-like surface is the element driven rotatively from an external source, the generation of one of the following:

(1) Strain inducer driven rotatively with the cooperating elements stationary, rotating or moving linearly.

(2) Cooperation element driven linearly with the strain inducer stationary, rotating and moving linearly.

Figure 24 illustrates diagrammatically the structure which may be employed in an embodiment according to paragraphs (b)2 and (c)2 above. In this form a push rod, link or connecting rod 192 has opposite pivotal connections 193 and 194 which are adjusted by varying the distance between the pivotal connections 193 and 194. This is accomplished by connecting the pivotal connection 193 to a strain tube 195 which surrounds a circumferentially grooved member or screw 196 connected to the pivotal connection 194. The circumferentially grooved member or screw 196 and the interior of the strain tube will bear the relations already described in any one of the forms of the invention, suitably that of Figure 1.

The strain tube at the end remote from the circumferentially grooved member or screw has an internal circular bore 197 which guides a circular extension 198 on the circumferentially grooved member or screw.

The strain tube at the place where it engages the circumferentially grooved member or screw at spaced points has circumferential bearing grooves 200 on its outer surface which receive ball bearing elements 201 which ride in internal bearing grooves 202 of a strain inducer 203 of the character heretofore described in reference to the invention. The strain inducer may for example be of the general type shown in Figure 1 but with the bearing feature as in Figures 29 and 30 (but external rather than internal).

The strain inducer is turned in any suitable manner as by providing gear teeth 204, on the outside which mesh with elongated pinion 205 turned on shaft 206 on suitable bearings and which may be manipulated by an electric motor or by hand, or in any other suitable manner.

The relative adjustment in length of the push rod link or connecting rod 192 is suggested by arrow 207. The fact that the input force may be introduced in one form at pivot 194 is suggested by arrow 208. The fact that the input force may be introduced in another form at pivot 193 is suggested by arrow 210.

If the element 192 merely reciprocates, the shaft 206 and pinion 205 may be stationary in space except for rotation, but if the element 192 is a link or connecting rod which reciprocates and also swings, as in a crank mechanism, the shaft 206 will be mounted to move with the element 192 and its rotational adjustment, if provided continuously, will be introduced by suitable means communicating with the moving device as by a flexible electrical connection to the motor turning the shaft 206.

When reference is made herein to circumferential grooves it is intended to indicate those which have positive helix angles, those which have negative helix angles, and those which are leadless or have zero helix angles.

When reference is made herein to a scrammable construction it is intended to indicate one which lends itself to emergency instant release.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a linear actuator, a first cylindrical strain tube having a deflectable wall and having first circumferential grooves on one periphery, a second member of different diameter than the strain tube having second circumferential grooves on one periphery concentric with and cooperating with the first circumferential grooves, the groove forms of the first and second circumferential grooves being the same, the first and second circumferential grooves having a difference in helix angle, a strain induced element operative to deflect the strain tube and maintaining the strain tube deflected into mating engagement between the first and second circumferential grooves at a plurality of circumferentially spaced lobe positions interspaced by nonmating positions, the difference in helix angle being a function of the number of lobes, and means for moving the operative relationship of the strain inducing element to the periphery of the strain tube and thereby propagating a strain wave around the periphery of the strain tube and causing relative linear motion of the strain tube with respect to the second member.

2. A linear actuator of claim 1, in which one of the first and second circumferential grooves has a multiple lead.

3. A linear actuator of claim 2 in which said multiple lead is on the second circumferential grooves.

4. A linear actuator of claim 2, in which said leadless ring-like circumferential grooves are provided on the strain tube.

5. A linear actuator of claim 1, in which leadless ring-like circumferential grooves are provided on the second member.

6. A linear actuator of claim 1, in which the circumferential grooves on the strain tube have a multiple lead.

7. A linear actuator of claim 1, in which the first and second circumferential grooves are respectively of opposite hand, one right hand and the other left hand.

8. A linear actuator of claim 1 in which in relaxed position the first and second circumferential grooves radially clear one another.

9. A linear actuator of claim 1, in which in relaxed position the first and second circumferential grooves do not radially clear one another.

10. A linear actuator of claim 1, having two diametrically opposed mating positions.

11. A linear actuator of claim 1, in which the strain tube is positioned outside the second member and the external surface of the second member engages the internal circumferential grooves of the strain tube.

12. A linear actuator of claim 1, in which the strain inducing element comprises a surface continuously engaging the strain tube at spaced points which create spaced deflection, said surface of the strain inducing element directly engaging the strain tube.

13. A linear actuator of claim 1, in which the strain inducing element comprises a raceway adjoining one circumferential surface of the strain tube, and means including bearing elements travelling in the raceway for propagating a strain wave against the wall of the raceway.

14. A linear actuator of claim 13, in which the strain inducing element also comprises a second raceway of eccentric form cooperating with the aforesaid raceway, and the bearing elements travelling in the two raceways transmit a strain wave from the second raceway through the aforesaid raceway to the strain tube.

15. A linear actuator of claim 1, in which the strain tube comprises a housing wall deflectable and forming a hermetic closure through which motion is transmitted, the second member being on one side and the strain inducer on the other side of said housing wall.

16. A linear actuator of claim 1, in which side thrust transverse to the axis is compensated by opposing side thrust within the device itself.

17. A linear actuator of claim 1, in which the circumferential grooves are spring preloaded in engagement and thereby compensate for variations in groove dimensions.

18. A linear actuator of claim 1, having a strain inducing element comprising a first ellipsoidal ring, a second ellipsoidal ring surrounding the first ellipsoidal ring, the ellipsoidal rings having pressure engaging means between one another and between one ellipsoidal ring and the strain tube, and means for shifting the relative circumferential arrangement of one ellipsoidal ring with respect to the other in order to vary the strain wave.

19. A linear actuator of claim 18, in combination with an antifriction bearing between the strain tube and one ellipsoidal ring and a second antifriction bearing between the two ellipsoidal rings.

20. In a linear actuator, a first circumferentially grooved element having integral deflectable circumferential grooves, a second circumferentially grooved element extending adjacent to and concentric with the first circumferentially grooved element having integral deflectable circumferential grooves cooperating with the circumferential grooves on said first element, means for deflecting the first element locally into engagement with the second element, and means for advancing the point of local engagement between the first and second elements along the same while relatively separating said first and second elements by deflection at other positions.

21. An actuator system comprising relatively inner and outer circumferentially grooved elements of different diameters, the circumferential grooves on one element cooperating with those on the other element, and means for deflecting said inner element into and out of engagement with said outer element and thereby creating a strain wave, the circumferential grooves of the inner and outer elements being free from engagement between two circumferentially spaced points of engagement.

22. In a groove system, a first grooved element having integral deflectable circumfernetial grooves, a second grooved element coaxial with and cooperating with the first and having integral deflectable circumferential grooves, and means for manipulating the circumferential grooves in the first and second elements relatively into engagement by relative radial motion toward and away from one another to produce linear motion.

23. In a groove system, a pair of coaxial cooperating circumferentially grooved elements, one of which has integral deflectable circumferential grooves, and means for relatively moving said grooves into and out of engagement with one another along a generally sinusoidal path.

24. In a groove system, a pair of coaxial cooperating circumferentially grooved elements, one of which has integral deflectable circumferential grooves, and means for straining one of the grooved elements into grooved engagement with the other grooved element, by tangentially rolling and radially sliding into and out of groove engagement.

25. In a groove system, a pair of coaxial cooperating circumferentially grooved elements, one of which has integral deflectable circumferential grooves, means for straining one of said grooved elements into engagement with the other grooved element and thereby creating a strain wave travelling around the grooved elements and producing linear motion of one of the grooved elements, there being lubricant in the space between the grooved elements at points where they are not mating, the lubricant being forced into intimate relationship between the mating surfaces of the grooved elements as they mate.

26. In a groove system, a pair of coaxial cooperating circumferentially grooved elements, one of which has integral deflectable circumferential grooves, one of the grooved elements constituting a strain tube element, comprising a plurality of tubes, one within another, and means for deflecting the deflectable circumferential grooves into mating relationship progressing in wave form around the grooved elements.

27. In a linear actuator, a pair of coaxial cooperating circumferentially grooved elements, one of which has integral deflectable circumferential grooves, and means for manipulating the grooved elements to produce linear motion of one of the grooved elements, neither of the grooved elements rotating in relation to the other grooved element.

28. In an actuator, a pair of coaxial cooperating circumferentially grooved elements of different helix angle, one of which has integral deflectable circumferential grooves for interengagement of the circumferentially grooved surfaces, and means for manipulating the grooved elements to bring the grooves of one into engagement with the grooves of the other and produce linear motion of one grooved element with respect to the other grooved element.

29. In an actuator, a pair of coaxial cooperating circumferentially grooved elements, one of which has integral deflectable circumferential grooves, the circumferentially grooved surfaces of the grooved elements being of different pitch diameter and being coincident at a plurality of circumferentially spaced points, and means for manipulating the grooved elements to bring the grooves of one into engagement with the grooves of the other and produce linear motion of one grooved element with respect to the other grooved element.

30. In an actuator, a pair of coaxial cooperating circumferentially grooved elements, one of which has integral deflectable circumferential grooves, and means for producing rolling groove interengagement between the circumferential grooved elements.

31. An actuator of claim 30, in which the rolling engagement is established without relative rotation of the elements with respect to one another.

32. In an actuator, a pair of coaxial cooperating circumferentially grooved elements, one of which has integral deflectable circumferential grooves, and means for bringing the grooved elements into engagement over wedge-like contacting surfaces between one grooved element and the other.

References Cited in the file of this patent
UNITED STATES PATENTS
2,482,082   Wahlberg _____ Sept. 13, 1949